United States Patent [19]

Helton et al.

[11] Patent Number: 5,416,772
[45] Date of Patent: May 16, 1995

[54] APPARATUS FOR INSERTION OF OVERHEAD PROTOCOL DATA INTO A SWITCHED DATA STREAM

[75] Inventors: John S. Helton, Louisville; Stephen R. Peck, Boulder; Floyd C. Wolverton, Westminster, all of Colo.

[73] Assignee: AT&T Corp., Murray Hill, N.J.

[21] Appl. No.: 109,766

[22] Filed: Aug. 20, 1993

[51] Int. Cl.6 .................................... H04Q 11/08
[52] U.S. Cl. ......................... 370/66; 370/112; 370/58.1
[58] Field of Search .......... 370/58.1, 58.2, 67, 370/68, 64, 59, 63, 53, 112, 102

[56] References Cited

U.S. PATENT DOCUMENTS

| | | | |
|---|---|---|---|
| 3,769,607 | 10/1973 | Thelen | 331/2 |
| 4,382,294 | 5/1983 | Beuscher et al. | 370/16 |
| 4,543,651 | 9/1985 | Chang | 370/16 |
| 4,546,468 | 10/1985 | Christmas et al. | 370/58.2 |
| 4,546,475 | 10/1985 | Sharpless et al. | 371/49 |
| 4,564,936 | 1/1986 | Takahashi | 370/68 |
| 4,755,995 | 7/1988 | Anderson et al. | 371/9 |
| 4,967,405 | 10/1990 | Upp et al. | 370/58.1 |
| 4,979,164 | 12/1990 | Ardon | 370/58.1 |
| 5,138,657 | 8/1992 | Colton et al. | 379/220 |
| 5,226,042 | 7/1993 | Ardon et al. | 370/68 |

Primary Examiner—Douglas W. Olms
Assistant Examiner—Ajit Patel
Attorney, Agent, or Firm—John C. Moran

[57] ABSTRACT

An apparatus that provides two different sources for generating the bytes to be inserted into frames of data being communicated through a switching unit. This apparatus allows for the insertion of variable, programmable data patterns in multiple frames. Under program control of a controller, the first source can selectively write data into designated time slots within designated rows and designated frames of multiple frames. Different data can be inserted into different rows of the same column of each frame. In addition, different data for different frames can be inserted into different rows of the same column. Also, the same data can be inserted into designated a row and column of a designated frame. The second source can write data into every row of a designated column of every frame.

29 Claims, 5 Drawing Sheets

WORD FORMAT OF REGISTER MEMORY 508

| FIELD | FUNCTION |
|---|---|
| 0000 → 1000 | SELECT ADDRESSED ROW |
| 1100 | SELECT ALL ROWS |
| 1111 | SEQUENCE ROWS AND FRAMES |

| DEFAULT SELECT | SUBSTITUTE SELECT | SELECTION |
|---|---|---|
| 0 | FALSE | DATA MEMORY |
| 1 | FALSE | ROUTING MEMORY |
| DON'T CARE | TRUE | SUBSTITUTE MEMORY |

APPARATUS FOR INSERTION OF OVERHEAD PROTOCOL DATA INTO A SWITCHED DATA STREAM

TECHNICAL FIELD

This invention relates to telecommunication data switching systems and, in particular, to flexible insertion of overhead data into switched data.

BACKGROUND OF THE INVENTION

In broadband telecommunication networking, there are two emerging standards: synchronous optical network (SONET) and synchronous digital hierarchy (SDH). While SONET is the wideband data networking standard in the United States, SDH is accepted as the international wideband standard for the network node interface. Services based on these fast transmission standards will replace services based on current independently docked plesiochronous networks. SDH defines the international standard for the network node interface, the point where existing plesiochronous signals are adapted to the synchronous hierarchy. SONET is its United States subset. Differences do exist between SONET and SDH; and in addition, both standards are evolving and adding new features. Within SDH, the basic module of data is the synchronous transport module (STM-1) frame. The STM-1 frame is the primary transmission unit of the SDH hierarchy and operates at a speed of 155.520 Mbps. Each STM-1 frame has 9 sets of timeslots with each set having 270 timeslots. Within a time slot interchange unit, a STM-1 frame is converted into a matrix of data bytes with each row being a set of timeslots and a column consisting of all occurrences of an individual timeslot in all rows. The resulting matrix has 9 rows and 270 columns. The STM-1 frame consists of a section overhead, SOH, of approximately 5.184 Mbps and a payload of 150.336 Mbps. The SOH of the STM-1 frame is reserve for SDH management, while the payload contains the information to be transmitted by customers.

STM payloads carry information in the form of virtual containers, VCs, as defined by the CCITT recommendation G.709. Plesiochronous signals from conventional digital networks are adapted to the higher container byte rates by means of inserting (also retorted to as stuffing) bytes. These inserting facilities are provided to adapt the plesiochronous signals to the synchronous network clock. Additional information called path overhead, POH, is added to the container to convert it into a VC. The POH contains information for control, supervision, and maintenance of the transmission network.

To achieve the full flexibility of SDH, a switching system must be able to insert bytes into the STM-1 frames. Given the flexibility that is provided by SDH, it is not always possible to predict which bytes will need to be replaced for future uses of STM-1 frames. Further, the STM-1 frame provides spare channels whose use may well require the insertion of bytes in future applications. In addition, a POH of a VC requires different bytes to be inserted into different STM-1 frames of an STM-1 multiframe. Prior an systems have allowed for minimal flexibility in the bytes to be inserted and have required that the inserted bytes be the same for each frame. Clearly, there exists a need for a system which has sufficient flexibility in the insertion of bytes for protocol purposes that will allow for future applications of SDH.

SUMMARY OF THE INVENTION

The foregoing problems are solved, and a technical advance is achieved by an apparatus that provides two different sources for generating the bytes to be inserted into flames of data. Advantageously, this apparatus allows for the insertion of variable, programmable data patterns in multiple frames. Under program control of a controller, the first source can selectively write data into designated time slots within designated rows and designated frames of multiple frames. Different data can be inserted into different rows of the same column of each frame. In addition, different data for different flames can be inserted into different rows of the same column. Also, the same data can be inserted into designated a row and column of a designated frame. The second source can write data into every row of a designated column of every frame.

DETAILED DESCRIPTION

Figure 1:
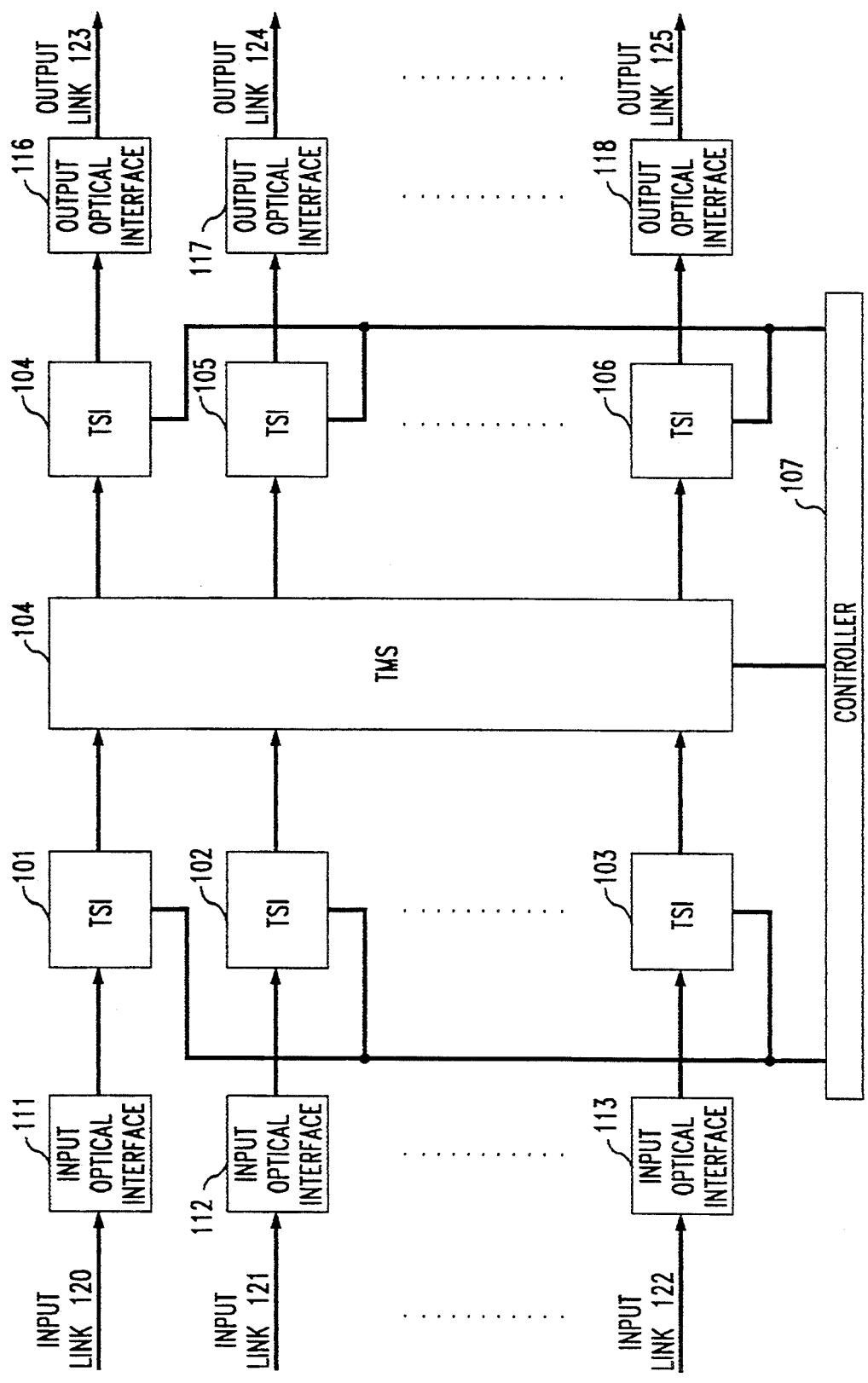
FIG. 1 illustrates, in block diagram form, a system for implementing the invention.

FIG. 1 shows a digital access cross-connect system (DACS) which implements the SDH protocol. As data is received in timeslots by timeslot interchanges (TSIs) 101 through 106 from input links 120 through 122 via input optical interfaces 111 through 113, the data is transferred to different timeslots if required for the switching of the data by the TSIs. The TSIs may be in general referred to as switching units. From TSIs 101 through 106, the data is transferred to time multiplex switch (TMS) 108. The TMS then transfers the data to the appropriate one of TSIs 104 through 106 which also transfer the data to different timeslots if required. From TSIs 104 through 106, the data is transferred to output links 123 through 125 via output optical interfaces 116 through 118. Input optical interfaces 101 through 103 convert the STM-1 155 Mbps serial data stream to the byte column format that is described with respect to FIGS. 2 and 3. Output optical interfaces 104 through 106 perform the reverse operations. The input and output interfaces can utilize only electrical components. In the DACS illustrated in FIG. 1, controller 107 provides overall control of the DACS.

Figure 2:
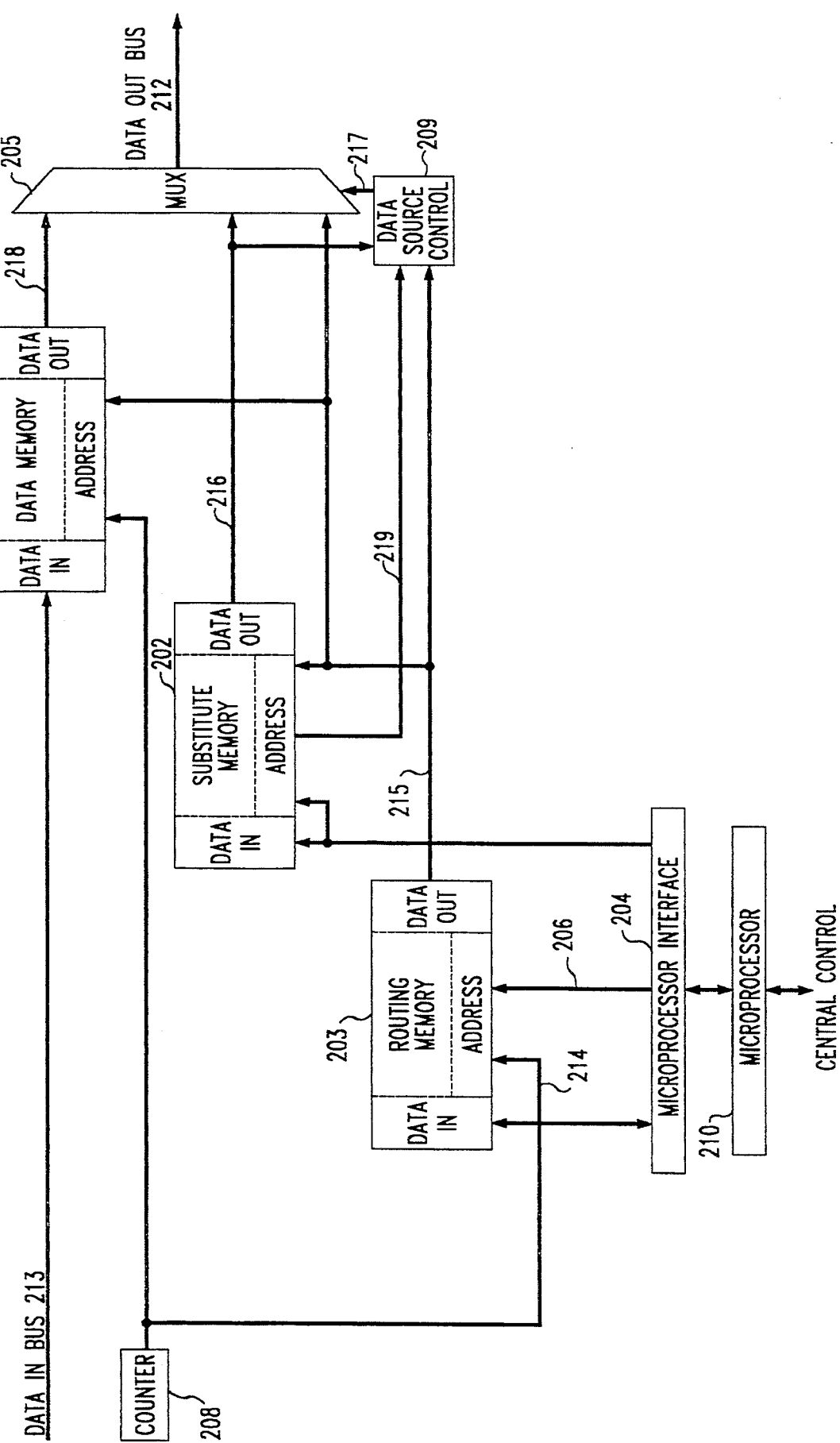
FIG. 2 illustrates, in block diagram form, a timeslot interchange in accordance with the invention.

TSI 101 is illustrated in greater detail in FIG. 2. As data is received on data-in bus 213, it is stored into data memory 201 under address control of counter 208. Counter 208 generates the timeslot sequence of the incoming data. If no bytes are being inserted, the data transmitted on data-out bus 212 is taken from data memory 201 with the address being supplied from routing memory 203. The address supplied from routing memory 203 defines the new timeslot for each byte of data.

The address information in routing memory 203 is stored by microprocessor 210 via microprocessor interface 204. Data memory 201 consists of two halves with one half being loaded with information while information is being extracted from the second half. Routing memory 203 consists of an active half and a standby half. Microprocessor 210 controls which half of the memory will be the active by transmission of a signal to routing memory 203 via cable 206 and microprocessor interface 204. The active half is accessed by the address on bus 214 which is the contents of counter 208 which is generating the timeslot number currently being processed for incoming data. Microprocessor 210 via microprocessor interface 204 writes data into the standby half of the routing memory utilizing addresses which are transmitted on bus 206. Once microprocessor 210 has written the proper information into the standby half of routing memory 203, microprocessor 210 will signal via bus 206 that the standby half is to become the active half.

Data source control 209 controls multiplexer 205 which determines which of the three memories will be utilized for transmission on data-out bus 212. If data is to be inserted into the data stream being transmitted on data-out bus 212, this data comes from substitute memory 202 or routing memory 203. Data source control 209 is responsive to information received from substitute memory 202 and routing memory 203 to make this decision.

Figure 3:
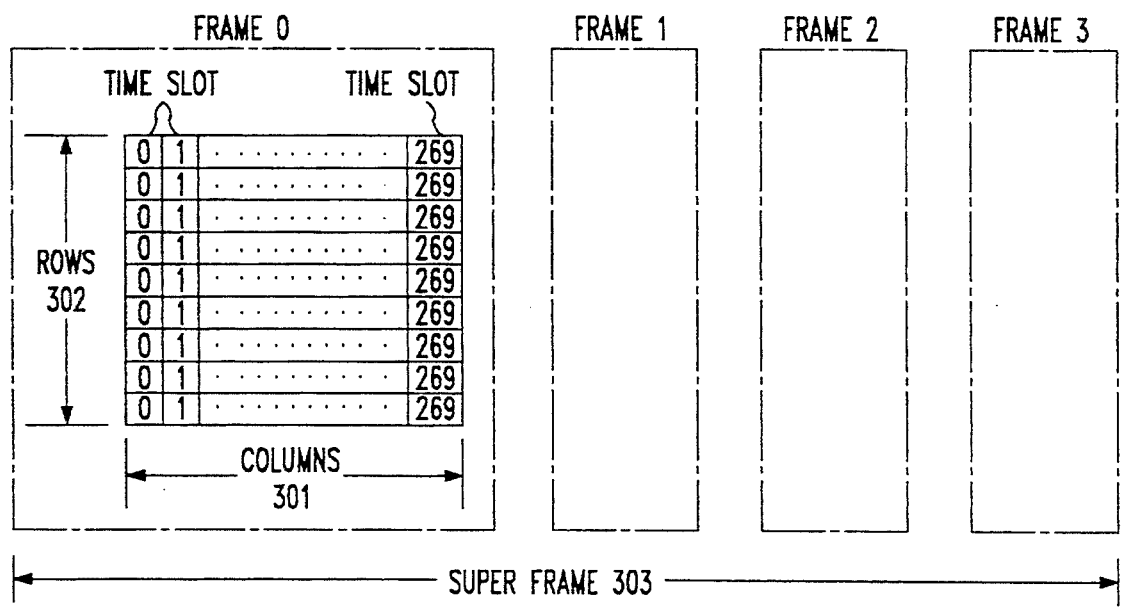
FIG. 3 illustrates the relationship of data being communicated through the timeslot interchange of FIG. 1 in terms of multiple frames.

Before proceeding further with the discussion of how bytes are inserted from either substitute memory 202 or routing memory 203, it is necessary to consider how the SDH protocol views the transmission of data. As previously mentioned, data is transmitted in STM-1 frames. Four frames are combined into a super frame previously referred to as a multiframe. FIG. 3 illustrates four frames and gives greater details on the composition of frame 0. A frame consists of nine rows, such as rows 302. Each row consists of 270 timeslots. Within the protocol, there is the concept of column which is illustrated in FIG. 3 by columns 301. For example, all timeslots 0 as illustrated in frame 0 make up column 0. Data memory 201 of FIG. 2 stores one row of a frame at a time. Routing memory 203 provides the necessary control to interchange timeslots within a row as that row is outputted on data-out bus 212 from data memory 201. Each timeslot consists of one byte of data or protocol. Whereas, data memory 201 has only one row of information that can be transmitted out on data-out bus 212, if the contents of routing memory 203 are utilized as data, then the bytes designated to be used as data are repeated each row of every frame. Substitute memory 202 has even greater flexibility in accordance with the invention. This flexibility is described with respect to FIG. 5.

Figure 4:
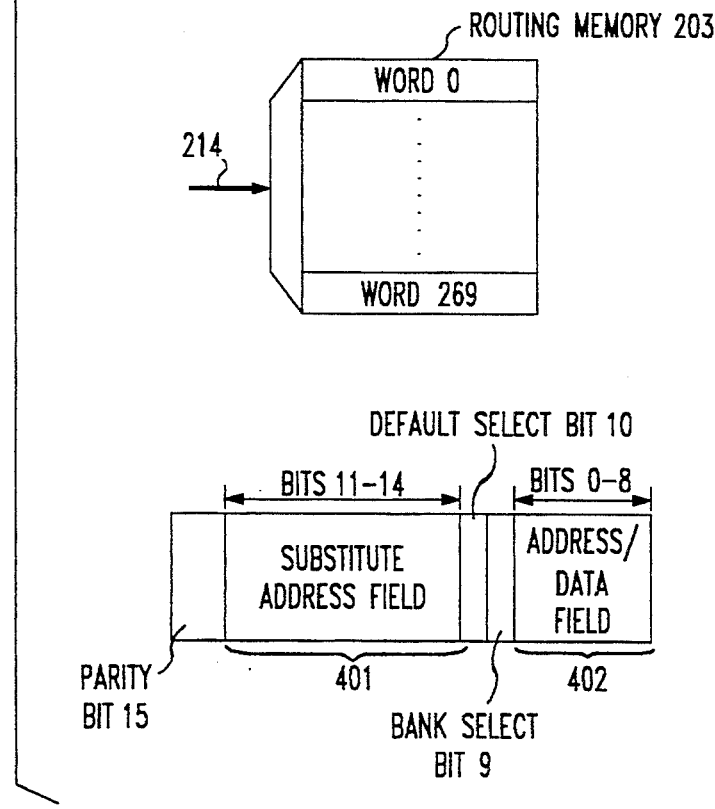
FIG. 4 illustrates the routing memory of FIG. 2 and the format of a word in this memory.

FIG. 4 shows the layout of routing memory 203 and the format of words stored within routing memory 203. Note, that routing memory 203 actually has two halves. One half is loaded by microprocessor 210 when it is necessary to change the contents of routing memory 203. From the other half, data/addresses are extracted to be utilized for control of data memory 201 or to be transmitted on data-out bus 212.

Figure 5:
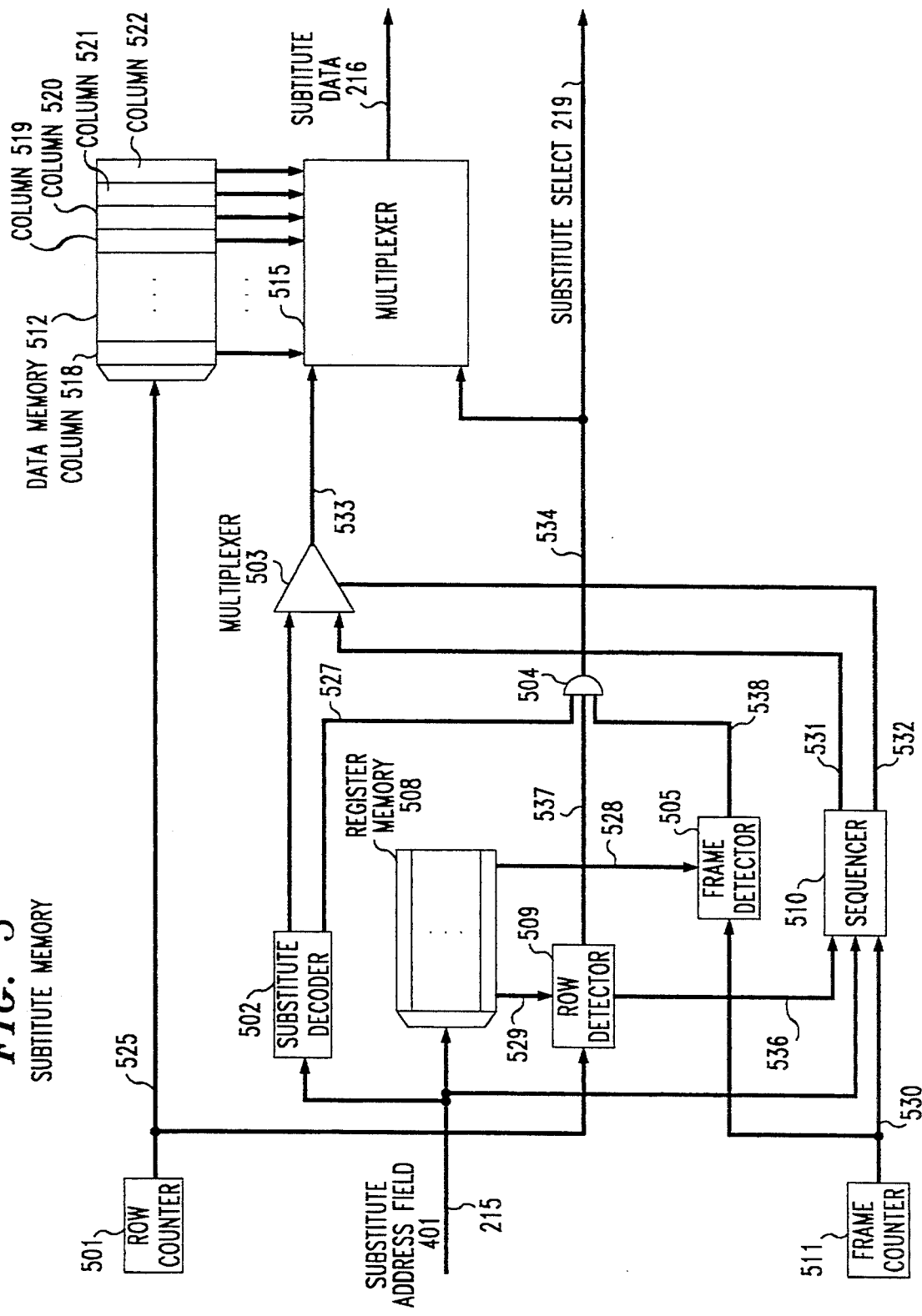
FIG. 5 illustrates, in logic diagram form, the substitute memory of FIG. 2.
Figures 6, 7, 8:
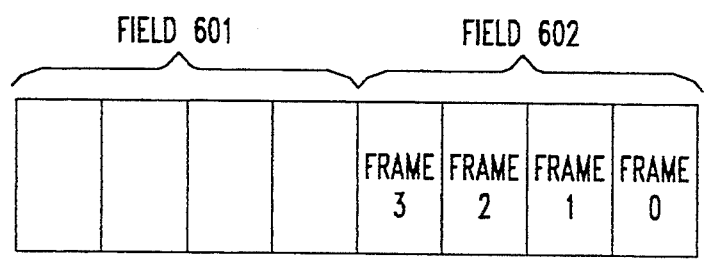
FIG. 6 illustrates the format of each word of the register memory of FIG. 5.
FIG. 7 defines the functions of field 601 of FIG. 6.
FIG. 8 defines the functions of data source control 209 of FIG. 2.

FIG. 5 illustrates in greater detail the internal structure of substitute memory 202. FIG. 6 illustrates the word format of register memory 508 of FIG. 5, and FIG. 7 illustrates the operations defined by field 601 of FIG. 6. Substitute memory 202 is capable of inserting a byte of data into any timeslot of any row and frame of the super frame illustrated in FIG. 3. To accomplish this capability, substitute memory 202 detects rows and frames and through an interaction with routing memory 203 detects timeslots. If substitute memory 202 is not to insert a byte of data for a particular timeslot in a given row and frame, then the substitute select signal transmitted by AND gate 504 via conductor 219 to data source control 209 is false. In response, data source control 209 then interrogates the default select byte of FIG. 4 from routing memory 203. If this bit is a zero, then the byte of data is taken from data memory 201; however, if the default select bit is one, address/data field 402 of routing memory 203 is used as data to be transmitted on data-out bus 212.

As previously noted, the decision of whether data is taken from substitute memory 202 is determined by the output of AND gate 504 which generates the substitute select signal. AND gate 504 requires three conditions to be true, before it signals that data is to be taken from substitute memory 202. First, substitute address field 401 of routing memory 203 for the current timeslot must designate that data will be taken from substitute memory 202. Substitute address field 401 is decoded by substitute decoder 502 which transmits a signal to AND gate 504 via conductor 527 if data is to be taken from substitute memory 202. The last two conditions for AND gate 504 to be satisfied are determined by the word that is accessed from register memory 508 by substitute address field 401 from routing memory 203. The word format for words stored in register memory 508 is illustrated in FIG. 6. Field 601 specifies the row number that must be matched before row detector 509 enables AND gate 504 via conductor 537. Field 602 defines the frame or frames that must be matched by frame detector 505 with respect to frame counter 511 before frame detector 505 enables AND gate 504 via conductor 538. If these three conditions are met, then data is taken from substitute memory 202 via multiplexor 515.

Consider now the details of substitute memory 202. Substitute memory 202 has two memories: register memory 508 and data memory 512. Data memory 512 consists of twelve columns or subsets of data with each column having nine words. These nine words directly relate to the nine rows shown in FIG. 3 for each frame. Register memory 508 has one word associated with each column of data memory 512. The format of this word is shown in FIG. 6. For each timeslot, routing memory 203 accesses a word whose format is illustrated in FIG. 4. Substitute address field 401 of that word is utilized to address register memory 508. Note, that substitute decoder 502 determines whether a valid column has been designated by substitute address field 401. Once the word has been accessed from register memory 508, field 602 of this word is matched with the current frame by frame detector 505. Any combination of frames 0 through 3 can be indicated by field 602. This allows the flexibility of repeating the same pattern from a given column of data memory 512 in a plurality of frames. Recall that there are only four frames in the super frame illustrated in FIG. 3. Row detector 509 then checks to see if the current row is specified in field 601 of the word being accessed from register memory 508. As illustrated in FIG. 7 which defines the functions of field 601, an individual row can be designated in field 601, all rows can be designated for this particular timeslot, or sequence rows and frames.

First, consider how individual rows are addressed. If row detector 509 detects in response to field 601 that only a single row is to output data for a particular timeslot, then row detector 509 transmits a true signal to AND gate 504 when the designated row occurs. Row counter 501 is continuously accessing data memory 512 with the row number. Since row detector 509 only detects this particular row, information is transmitted from substitute memory 202 for the occurrence of this particular row. The frame or frames during which the information is transmitted are designated by field 602 of the word being accessed from register memory 508. This frame designation from the accessed word is matched with the output of frame counter 511 by frame detector 505. The frame designation can be any combination of the four frames of the super frame. In the case where field 601 indicates an individual row, multiplexor 503 under control of sequencer 510 selects the output of substitute decoder 502 which is the column of data memory 512 designated by substitute address field 401 of the word currently being accessed from routing memory 203.

Second, consider where field 601 specifies that all rows are to be selected which is a "1100" in field 601. When row detector 509 receives this configuration of bytes, it continuously transmits a "1" to AND gate 504. For each frame that frame detector 505 matches with field 602, the information from substitute memory 202 is utilized for transmission on data-out bus 212. Note that the substitute address field 401 had to be selecting a valid word within register memory 508 for the select-all rows indication to be outputted in field 601; hence, substitute decoder 502 is outputting a true signal to AND gate 504 via conductor 527. Given these conditions, each word in the selected column is outputted on bus 216 as each word is selected by the appropriate row address received via bus 525.

The third function of field 601 is to sequence rows and frames. If this is specified and column 522 is specified in substitute address 401, information from column 519 is utilized for frame 0 of FIG. 3, information from column 520 is utilized for frame 1, information from column 521 is utilized for frame 2, and information from column 522 is utilized for frame 3. The frames designation is defined in FIG. 3. This sequencing is handled by sequencer 510 which also controls multiplexor 503 so that the column selection information is taken from sequencer 510 for multiplexor 515 rather than from substitute decoder 502. These three functions of field 601 are now described by way of examples in the following paragraphs. If substitute memory 202 is not utilized for supplying data for transmission on data-out bus 212, then substitute address field 401 of the word being accessed from routing memory 203 does not specify a valid column in data memory 512. This results in the substitute select signal transmitted by AND gate 504 on conductor 219 being false. In response to a false signal being transmitted on conductor 219, data source control 209 in accordance with the table of FIG. 8 selects information either from data memory 201 or routing memory 203 depending upon the state of the default select bit of the word being read out of routing memory 203 as illustrated in FIG. 4.

Consider the example where a byte from timeslot 2 of row 2 of column 518 is to be inserted in frames 0 and 2. This example illustrates the first function of FIG. 7. Microprocessor 210 via microprocessor interface initializes this function by writing a word in register memory 508 associated with column 518 with the following information. Field 601 is set equal to "0010" and "1's" are placed in the frame 0 and frame 2 subfields of field 602. In the word of routing memory 203 associated with timeslot 2, microprocessor 210 writes into substitute address field 401 address information to address the word in register memory 508 associated with column 518 of data memory 512. Assuming that the byte in data memory 201 will be utilized unless the conditions are timeslot 2 in row 2 of frames 0 or 2, microprocessor 210 sets the default select bit equal to zero in the word of routing memory 203 addressed by timeslot 2. When timeslot 2 occurs in frame 0, the above formatted word is read out of routing memory 203, and the substitute address field 401 accesses register memory 508. In addition, substitute decoder 502 sends a true signal to AND gate 504 via conductor 527 in response to the accessed word. When row 2 is currently being processed, row detector 509 matches field 601 with the output of row counter 501 being transmitted via bus 525. Row detector 509 transmits a true signal to AND gate 504 via conductor 537. When frame 0 is currently being processed, frame detector 505 matches the contents of frame counter 511 and the bit indicating that frame 0 is to be active in field 602 and transmits a true signal to AND gate 504. In response to these three signals, AND gate 504 transmits substitute select signal as a true signal to data source control 209 of FIG. 2 which conditions multiplexor 205 to accept data from substitute memory 202. The output of row counter 501 is utilized to access the words in data memory 512 associated with row 2. Multiplexor 515 is responsive to these access bytes to transmit the word from column 518 which is specified by the output of multiplexor 503. Sequencer 510 is responsive to the substitute address field 401 specifying row 2 to condition multiplexor 503 via conductor 532 to select the output of substitute decoder 502 on bus 526. The contents of bus 525 specify that column 518 is to be selected. Similar operations are performed for timeslot 2, row 2, and frame 2. All other combinations of timeslots and rows and frames do not cause the byte contained in column 518, row 2 to be transferred to multiplexor 205 via bus 216.

The second example deals with the command in field 601 of FIG. 6 which results in all bytes of data from a particular column in data memory 512 being transmitted out on data-out bus 212. This is the second function listed in FIG. 8. This example assumes that for timeslot 0 and frame 0, data is to be transmitted for each row from data memory 512 onto data-out bus 212 via multiplexor 205. In the word associated with timeslot 0 in routing memory 203, microprocessor 210 stores the address of column 518 in substitute address field 401. Microprocessor 210 then stores in the word associated with column 518 in register memory 508 a word which has a "1" in frame 0 subfield of field 602 and the bits "1100" in field 601 which is the select-all row function designation. When timeslot 0 and frame 0 occur, substitute address field 401 from routing memory 203 addresses the word associated with column 518 in register memory 508. Row detector 509 is responsive to the select-all row indication in field 601 to transmit a true signal to AND gate 534 regardless of what row is being accessed. Note, that row counter 501 addresses each byte in column 518 associated with a particular row. Frame detector 505 is responsive to the designation of frame 0 in field 602 to transmit a true signal to AND gate 534 since frame counter 511 is indicating frame 0. Substitute decoder 502 is responsive to substitute address field 401 to transmit a true signal to AND gate 504 since it is a valid substitute address field 401. Sequencer 510 is responsive to substitute address field 401 designating column 518 to transmit a signal via conductor 532 to multiplexor 503. In response, multiplexor 503 accepts the address being transmitted from substitute decoder 502. Under control of the row address being transmitted on bus 525 from row counter 501, the information accessed from data memory 512 is transferred to multiplexer 515. Under control of multiplexor 503, multiplexer 515 transmits the data from column 518 to bus 216. Since data source control 209 is receiving the substitute select signal as a true on conductor 219, data source control 209 conditions multiplexor 205 in accordance with the table of FIG. 8 to select the output of substitute memory 202 for transmission on data-out bus 212. This operation will be performed for all occurrences of timeslot 0 and frame 0. Any other combination of timeslots or frames will result in the above-described operation not being performed.

Consider now an example where substitute memory 202 is utilized to output data on data-out bus 212 that is different for each row and for each frame. This capability is designated as the sequence rows and frames function of FIG. 7. The ability to sequence through each of the four frames of a super frame is restricted to substitute address field 401 designating column 522 and the word in register memory 508 associated with column 522 containing in field 601 all ones. When routing memory 203 and register memory 508 have been properly initialized, the operations are as follows. Note, that the word associated with column 522 in register memory 508 must have all bits set in field 602 if the sequencing is to occur for every frame. In the present example, the sequencing through each of the four frames of the super frame will occur on the occurrence of timeslot 0 as is described in the following sentences. The result of this function is that for each occurrence of timeslot 0 in frame 0, row counter 501 sequentially accesses the bytes in column 519 and outputs these bytes on bus 216. Similarly, in frame 1, data is accessed from column 520 for each row and occurrence of timeslot 0 and outputted on bus 216. Similar operations are performed with respect to columns 521 and 522 and frames 2 and 3, respectively.

Consider now this example in greater detail. When the word associated with timeslot 0 is accessed from routing memory 203, substitute address field 401 is transmitted to register memory 508. Stored in the access word of register memory 508 in field 601 is "1111" which designates the sequence rows and frames function. Row detector 509 decodes this function and transmits a signal to sequencer 510 via conductor 536. Sequencer 510 controls multiplexor 503 to accept addressing information for multiplexor 515 from sequencer 510 via bus 531. Sequencer 510 controls multiplexor 503 by transmitting a control signal to multiplexor 503 via conductor 532. In addition, row detector 509 transmits a true signal to AND gate 504 via conductor 537. Substitute decoder 502 is responsive to field 601 designating the sequence rows frames function to transmit a true signal to AND gate 504 via conductor 527. Frame detector 505 is still responsive to field 602 received via bus 528 from register memory 508 to determine which frames are included in the sequencing. If all frames are to be included, field 602 is set to all "1's". Assuming that field 602 is set to all "1's", frame detector 505 transmits a true signal to AND gate 504 via conductor 538 for each frame.

Sequencer 510 is responsive to frame counter 511 which is counting the frames of the super frame to transmit addresses to multiplexer 503 that select the appropriate column of data memory 512 for controlling multiplexor 515. For example, if the frame counter indicates frame 3, sequencer 510 transmits via bus 531 the address to select column 522.

Each time timeslots 0 occurs, the output of row counter 501 on bus 525 is utilized to access data memory 512. Hence, for each occurrence of timeslot 0, the row being accessed from the column being selected by the multiplexor 515 is transmitted on bus 216 to multiplexor 205 where it is retransmitted on data-out bus 212. Data source control 209 is responsive to the substitute select signal generated by AND gate 504 being a true to select the output of substitute memory 202 in accordance with the table given in FIG. 8. As was previously described, the three inputs of 504 are true resulting in the substitute select signal being true.

Although the previous example has assumed that field 602 is set to "1's", this is not required. If a particular frame is not designated in field 602, frame detector 505 transmits a false signal on conductor 538 to AND gate 504 for that frame. In response, AND gate 504 transmits the substitute select signal as a false signal on conductor 534. Data source control 209 is responsive to the substitute select signal being false to condition multiplexor 205 to accept the output of either data memory 201 or routing memory 203 as determined by the default bit of the word associated with timeslot 0 being accessed from routing memory 203.

It is to be understood that the above-described embodiment is merely illustrative of the principles of this invention; other arrangements may be devised by those skilled in the art without departing from the spirit and scope of the invention. In particular, one skilled in the art could readily envision expanding the allowed selection of rows for data insertion to combinations other than just a single row or all rows of a column.

We claim:

1. An apparatus for inserting variable data into a plurality of frames of data being communicated through a switching unit and each frame having a repeating plurality of sets of time slots which are the same plurality of sets as used by other ones of the plurality of frames with all sets having a repeating plurality of time slots which are the same time slots as used by other ones of the plurality of sets in accordance with a protocol in accordance with the synchronous digital hierarchy standard, and the apparatus comprising:

means for controlling the switching unit;

first means responsive to the plurality of frames for designating a first time slot and for variably inserting first data into the first designated time slot of all of the plurality of sets of all of the plurality of frames upon being initialized by the controlling means storing the first data into the first means;

second means responsive to plurality of frames for designating first ones of the plurality of frames, first ones of the plurality of sets of the designated ones of the plurality of frames, and second time slots of the first designated ones of the plurality of sets, and for variably inserting second data into ones of second designated time slots upon doing initialized by the controlling means storing the second data into the second means;

means for multiplexing the inserted first data and the inserted second data;

means for identifying a present time slot now being processed by the switching unit and the second inserting means comprises means for identifying a present frame now being processed by the switching unit;

means for identifying a present set now being processed by the switching unit;

means for storing time slot information defining the ones of the second designated time slots with the time slot information being stored by the controlling means;

means for storing set information defining the first designated ones of plurality of sets with the set information being stored by the controlling means;

means for storing frame information defining the first designated ones of plurality of frames with the frame information being stored by the controlling means;

means for storing the second data with the second data comprising a plurality of words with each word identified by an individual one of the plurality of sets and the words being stored by the controlling means;

means for comparing the time slot information with the present time slot, the set information with the present set, the frame information with the present frame and for indicating a match if all comparisons are true; and means for accessing in response to the match indication the word identified by the present set and inserting that word into the present time slot.

2. The apparatus of claim 1 wherein the first means comprises means for storing other time slot information defining the first designated time slot with the other time slot information being stored by the controlling means;

means for storing the first data with the first data comprising one word with the word being stored by the controlling means;

means for comparing the other time slot information with the present time slot and for indicating a other match if the comparison is true; and means for accessing in response to the other match indication the word of the first data and inserting that word into the present time slot.

3. The apparatus of claim 1 wherein the switching unit is a time slot interchange unit.

4. An apparatus for inserting variable data into a plurality of frames of data being communicated through a switching unit and each frame having a repeating plurality of sets of time slots which are the same plurality of sets as used by other ones of the plurality of frames with all sets having a repeating plurality of time slots which are the same time slots as used by other ones of the plurality of sets in accordance with a predefined protocol, and the apparatus comprising:

means for controlling the switching unit;

first means responsive to the plurality of frames for designating a first time slot and for variably inserting first data into the first designated time slot of all of the plurality of sets of all of the plurality of frames upon being initialized by the controlling means storing the first data into the first means;

second means responsive to plurality of frames for designating first ones of the plurality of frames, first ones of the plurality of sets of the designated ones of the plurality of frames, and second time slots of the first designated ones of the plurality of sets, and for variably inserting second data into ones of second designated time slots upon being initialized by the controlling means storing the second data into the second means;

means for multiplexing the inserted first data and the inserted second data;

means for identifying a present time slot now being processed by the switching unit;

the second inserting means comprises means for identifying a present frame now being processed by the switching unit;

means for identifying a present set now being processed by the switching unit;

means for storing time slot information defining the ones of the second designated time slots with the time slot information being stored by the controlling means;

means for storing set information defining the first designated ones of plurality of sets with the set information being stored by the controlling means;

means for storing frame information defining the first designated ones of plurality of frames with the frame information being stored by the controlling means;

means for storing the second data with the second data comprising a plurality of subsets of data with each subset identified by an individual one of the plurality of frames and each subset having a plurality of words with each word identified by an individual one of the plurality of sets and the words being stored by the controlling means;

means for comparing the time slot information with the present time slot, the set information with the present set, the frame information with the present frame and for indicating a match if all comparisons are true; and means for accessing in response to the match indication the word identified by the present set and present frame and inserting that word into the present time slot.

5. The apparatus of claim 4 wherein the protocol is in accordance with the synchronous digital hierarchy standard.

6. The apparatus of claim 5 wherein the switching unit is a time slot interchange unit.

7. The apparatus of claim 4 wherein the protocol is in accordance with the synchronous optical network standard.

8. The apparatus of claim 7 wherein the switching unit is a time slot interchange unit.

9. An apparatus for inserting variable data into a plurality of framers of data being communicated through a switching unit and each frame having a repeating plurality of sets of time slots which are the same plurality of sets as used by other ones of the plurality of frames with all sets having a repeating plurality of time slots which are the same time slots as used by other ones of the plurality of sets in accordance with a predefined protocol, and the apparatus comprising means for controlling the switching unit;

first means responsive to the plurality of frames for designating a first time slot and for variably inserting first data into the first designated time slot of all of the plurality of sets of all of the plurality of frames upon being initialized by the controlling means storing the first data into the first means;

second means responsive to plurality of frames for designating first ones of the plurality of frames, first ones of the plurality of sets of the designated ones of the plurality of frames, and second time slots of the first designated ones of the plurality of sets wherein the second designated time slots only comprise one time slot, and for variably inserting second data into ones of second designated time slots upon being initialized by the controlling means storing the second data into the second means;

means for multiplexing the inserted first data and the inserted second data;

means for identifying a present time slot now being processed by the switching unit;

the second inserting means comprises means for identifying a present frame now being processed by the switching unit;

means for identifying a present set now being processed by the switching unit;

means for storing time slot information defining the ones of the second designated time slots with the time slot information being stored by the controlling means;

means for storing set information defining the first designated ones of plurality of sets with the set information being stored by the controlling means;

means for storing frame information defining the first designated ones of plurality of frames with the frame information being stored by the controlling means;

means for storing the second data with the second data comprising a plurality of subsets of data with each subset identified by an individual one of the plurality of frames and each subset having one word with the word identified by an individual one of the plurality of sets and the word being stored by the controlling means;

means for comparing the time slot information with the present time slot, the set information with the present set, the frame information with the present frame and for indicating a match if all comparisons are true; and means for accessing in response to the match indication the word identified by the present set and present frame and inserting that word into the present time slot.

10. The apparatus of claim 9 wherein the protocol is in accordance with the synchronous digital hierarchy standard.

11. The apparatus of claim 10 wherein the switching unit is a time slot interchange unit.

12. The apparatus of claim 9 wherein the protocol is in accordance with the synchronous optical network standard.

13. The apparatus of claim 12 wherein the switching unit is a time slot interchange unit.

14. A method for inserting variable data into a plurality of frames of data being communicated through a switching unit and each frame having a repeating plurality of sets of time slots which are the same plurality of sets as used by other ones of the plurality of frames with all sets having a repeating plurality of time slots which are the same time slots as used by other ones of the plurality of sets in accordance with a predefined protocol, and the method comprising the steps of:

controlling the switching unit;

designating, in response to the plurality of frames, a first time slot upon being initialized by the controlling step storing first data for use by this designating step;

designating, in response to the plurality of frames, first ones of the plurality of frames, first ones of the plurality of sets of the designated ones of the plurality of frames, and second time slots of the first designated ones of the plurality of sets upon being initialized by the controlling step storing second data for use by this designating step;

variably inserting, in response to the plurality of frames, the first data into the first designated time slot of all of the plurality of sets of all of the plurality of frames upon being initialized by the controlling step storing the first data for use by the step of inserting first data;

variably inserting, in response to the plurality of frames, the second data into ones of the second designated time slots upon being initialized by the controlling step storing the second data for use by the step of inserting second data;

multiplexing the inserted first data and inserted second data;

identifying a present time slot now being processed by the switching unit;

the step of inserting second data comprises the steps of identifying a present frame now being processed by the switching unit;

identifying a present set now being processed by the switching unit;

storing time slot information defining the ones of the second designated time slots with the time slot information being stored by the controlling step;

storing set information defining the first designated ones of plurality of sets with the set information being stored by the controlling step;

storing frame information defining the first designated ones of plurality of frames with the frame information being stored by the controlling step;

storing the second data with the second data comprising a plurality of words with each word identified by an individual one of the plurality of sets and the words being stored by the controlling step;

comparing the time slot information with the present time slot, the set information with the present set, the frame information with the present frame and indicating a match if all comparisons are true; and accessing in response to the match indication the word identified by the present set and inserting that word into the present time slot.

15. The method of claim 14 wherein the protocol is in accordance with the synchronous digital hierarchy standard.

16. The method of claim 15 wherein the switching unit is a time slot interchange unit.

17. The method of claim 14 wherein the protocol is in accordance with the synchronous optical network standard.

18. The method of claim 17 wherein the switching unit is a time slot interchange unit.

19. The method of claim 14 wherein the step of inserting first data comprises the steps of storing other time slot information defining the first designated time slot with the other time slot information being stored by the controlling step;

storing the first data with the first data comprising one word with the one word being stored by the controlling step;

comparing the other time slot information with the present time slot and indicating a other match if the comparison is true; and accessing in response to the other match indication the word of the first data and inserting that word into the present time slot.

20. A method for inserting variable data into a plurality of frames of data being communicated through a switching unit and each frame having a repeating plurality of sets of time slots which are the same plurality of sets as used by other ones of the plurality of frames with all sets having a repeating plurality of time slots which are the same time slots as used by other ones of the plurality of sets in accordance with a predefined protocol, and the method comprising the steps of:

controlling the switching unit;

designating, in response to the plurality of frames, a first time slot upon being initialized by the controlling step storing first data for use by this designating step;

designating, in response to the plurality of frames, first ones of the plurality of frames, first ones of the plurality of sets of the designated ones of the plurality of frames, and second time slots of the first designated ones of the plurality of sets upon being initialized by the controlling step storing second data for use by this designating step;

variably inserting, in response to the plurality of frames, the first data into the first designated time slot of all of the plurality of sets of all of the plurality of frames upon being initialized by the controlling step storing the first data for use by the step of inserting the first data;

variably inserting, in response to the plurality of frames, the second data into ones of second designated time slots upon being initialized by the controlling step storing the second data for use by the step of inserting second data;

multiplexing the inserted first data and inserted second data;

identifying a present time slot now being processed by the switching unit;

the step of inserting second data comprises the steps of identifying a present frame now being processed by the switching unit;

identifying a present set now being processed by the switching unit;

storing time slot information defining the ones of the second designated time slots with the time slot information being stored by the controlling step;

storing set information defining the first designated ones of plurality of sets with the set information being stored by the controlling step;

storing frame information defining the first designated ones of plurality of frames with the frame information being stored by the controlling step;

storing the second data with the second data comprising a plurality of subsets of data with each subset identified by an individual one of the plurality of frames and each subset having a plurality of words with each word identified by an individual one of the plurality of sets and the words being stored by the controlling step;

comparing the time slot information with the present time slot, the set information with the present set, the frame information with the present frame and indicating a match if all comparisons are true; and accessing in response to the match indication the word identified by the present set and present frame and inserting that word into the present time slot.

21. The method of claim 20 wherein the protocol is in accordance with the synchronous digital hierarchy standard.

22. The method of claim 21 wherein the switching unit is a time slot interchange unit.

23. The method of claim 20 wherein the protocol is in accordance with the synchronous optical network standard.

24. The method of claim 23 wherein the switching unit is a time slot interchange unit.

25. A method for inserting variable data into a plurality of frames of data being communicated through a switching unit and each frame having a repeating plurality of sets of time slots which are the same plurality of sets as used by other ones of the plurality of frames with all sets having a repeating plurality of time slots which are the same time slots as used by other ones of the plurality of sets in accordance with a predefined protocol, and the method comprising the steps of:

controlling the switching unit;

designating, in response to the plurality of frames, a first time slot upon being initialized by the controlling step storing first data for use by this designating step;

designating, in response to the plurality of frames, first ones of the plurality of frames, first ones of the plurality of sets of the designated ones of the plurality of frames, and second time slots of the first designated ones of the plurality of sets upon being initialized by thee controlling step storing second data for use by this designating step;

variably inserting, in response to the plurality of frames, the first data into the first designated time slot of all of the plurality of sets of all of the plurality of frames upon being initialized by the controlling step storing the first data for use by the step of inserting the first data;

variably inserting, in response to the plurality of frames, the second data into ones of the second designated time slots upon being initialized by the controlling step storing the second data for use by the step of inserting second data wherein the second designated time slots only comprise one time slot;

multiplexing the inserted first data and inserted second data;

identifying a present time slot now being processed by the switching unit;

the step of inserting second data comprises the steps of identifying a present frame now being processed by the switching unit;

identifying a present set now being processed by the switching unit;

storing time slot information defining the ones of the second designated time slots with the time slot information being stored by the controlling step;

storing set information defining the first designated ones of plurality of sets with the set information being stored by the controlling step;

storing frame information defining the first designated ones of plurality of frames with the frame information being stored by the controlling step;

storing the second data with the second data comprising a plurality of subsets of data with each subset identified by an individual one of the plurality of frames and each subset having one word with the word identified by an individual one of the first designated ones of the plurality of sets and the word being stored by the controlling step;

comparing the time slot information with the present time slot, the set information with the present set, the frame information with the present frame and indicating a match if all comparisons are true; and accessing in response to the match indication the word identified by the present set and present frame and inserting that word into the present time slot.

26. The method of claim 25 wherein the protocol is in accordance with the synchronous digital hierarchy standard.

27. The method of claim 26 wherein the switching unit is a time slot interchange unit.

28. The method of claim 25 wherein the protocol is in accordance with the synchronous optical network standard.

29. The method of claim 28 wherein the switching unit is a time slot interchange unit.

* * * * *